(12) United States Patent
Greiner et al.

(10) Patent No.: US 8,327,380 B2
(45) Date of Patent: Dec. 4, 2012

(54) METHOD AND INTERPROCESS COMMUNICATION DRIVER FOR MANAGING REQUESTS OF A DATABASE CLIENT TO A DATABASE SERVER

(75) Inventors: Markus Greiner, Ober-Ramstadt (DE); Klaus Schuler, Darmstadt (DE)

(73) Assignee: Software AG, Darmstadt (DE)

( * ) Notice: Subject to any disclaimer, the term of this patent is extended or adjusted under 35 U.S.C. 154(b) by 779 days.

(21) Appl. No.: 12/457,811

(22) Filed: Jun. 22, 2009

(65) Prior Publication Data

US 2010/0042679 A1 Feb. 18, 2010

(30) Foreign Application Priority Data

Aug. 12, 2008 (EP) .................................. 08014366

(51) Int. Cl.
*G06F 13/00* (2006.01)

(52) U.S. Cl. ......... 719/312; 719/313; 719/314; 719/321
(58) Field of Classification Search .................. 719/312, 719/313, 314, 321

See application file for complete search history.

(56) References Cited

U.S. PATENT DOCUMENTS

| 6,526,494 B1 * | 2/2003 | Kougiiouris et al. ......... 711/170 |
| 2004/0122953 A1 | 6/2004 | Kalmuk et al. |
| 2005/0050553 A1 * | 3/2005 | Hen et al. ...................... 719/321 |
| 2007/0011687 A1 * | 1/2007 | Ilik et al. ....................... 719/313 |

OTHER PUBLICATIONS

"Querying very Large Multi-Dimensional Datasets in ADR", Kurc et al., Proceedings of the ACM/IEEE SC 99 Conference, Nov. 13-18, 1999, pp. 1-15.
"A High Performance Configurable Storage Manager", Biliris et al., 1995 IEEE, Mar. 6, 1995, pp. 35-43.

* cited by examiner

*Primary Examiner* — Andy Ho
(74) *Attorney, Agent, or Firm* — Nixon & Vanderhye PC

(57) ABSTRACT

Certain example embodiments relate to techniques for managing the interprocess communication between at least one database client process and at least one database server process in a database system. The at least one database client process sends at least one request to the at least one database server process, with the at least one request comprising one or more buffers. The one or more buffers are transferred, in a single step, from the at least one database client process to a buffer area. The one or more buffers are transferred, in a single step, from the buffer area to the at least one database client process. The buffer area is directly accessible by the at least one database server process.

15 Claims, 7 Drawing Sheets

Figure 1:
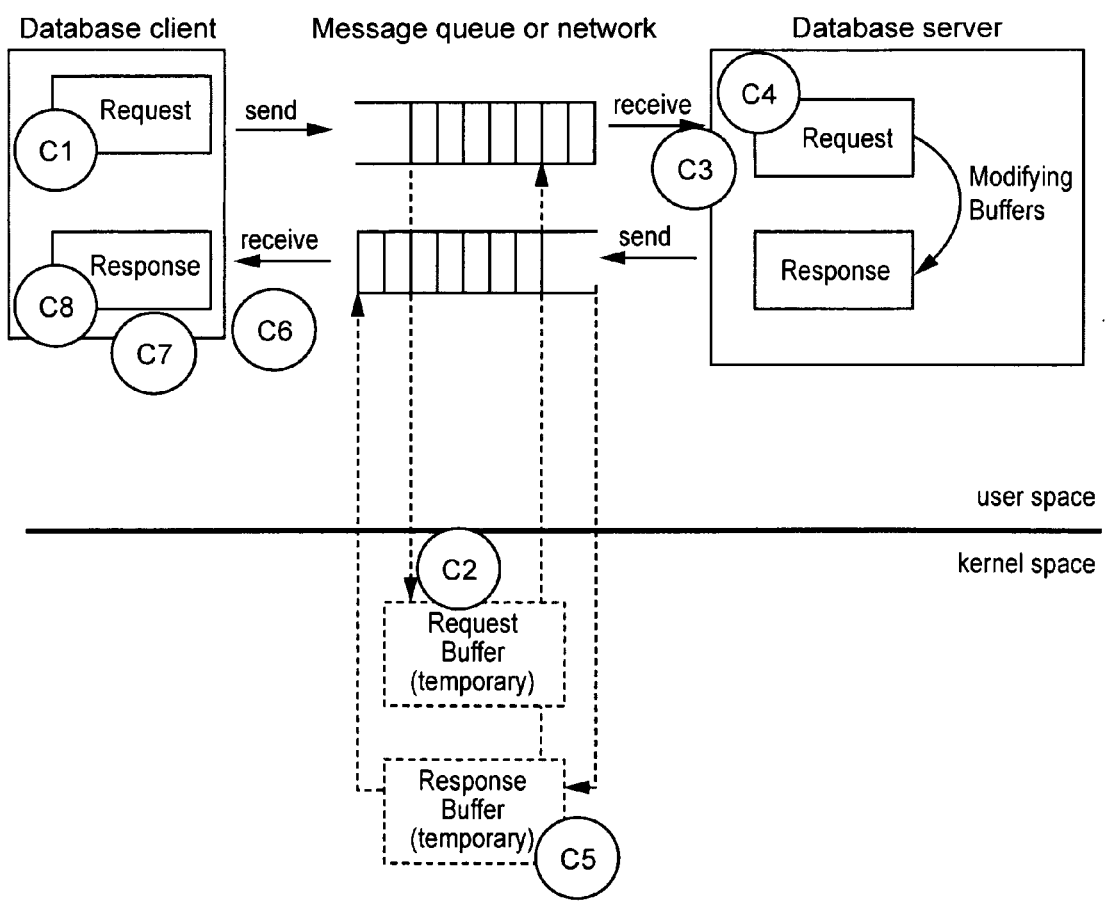

METHOD AND INTERPROCESS COMMUNICATION DRIVER FOR MANAGING REQUESTS OF A DATABASE CLIENT TO A DATABASE SERVER

This application claims priority to European Application No. 08014366.2, filed 12 Aug. 2008, the entire contents of which are hereby incorporated by reference.

1. TECHNICAL FIELD

The present invention relates to a method and an interprocess communication driver for managing requests of a database client to a database server.

2. THE PRIOR ART

Database management systems usually comprise one or more database servers which execute queries or updates based on requests sent by database clients. When executing a query request, a database server may also return a response to the database client comprising the query results.

Nowadays, distributed database systems are becoming more and more popular, i.e. the database clients and servers are geographically distributed and communicate e.g. over the internet. However, local database systems, i.e. database systems where the database clients and servers reside on the same physical machine, are also widely used, e.g. for corporate databases within enterprises. Both types of databases are addressed by the present invention.

Since database clients and servers may be executed as distinct operating system processes, even on the same physical machine, an interprocess communication is needed in order to route the requests from the database client process to the database server process and the responses back in the opposite direction.

Furthermore, a database request may comprise several buffers. One of the critical performance issues is how fast these buffers are communicated from the client process to the server process and how fast the response buffers are communicated from the server process to the client process. Prior art approaches for the communication of the buffers are typically based on operating system message queues or a network protocol. Some operating systems provide network protocols such as TCP for the communication between processes, although the client and server process may reside on the same machine. To this end, the client process inserts the buffers of the request into its endpoint of the message queue or the network connection. The server process waits for incoming request buffers on its message queue or network connection endpoint. After having processed the request, the server process returns the result buffers via the message queue or the network connection (see FIGS. 2a and 2b).

The U.S. Pat. No. 7,246,167 B2 discloses a communications multiplexor within a database system. The communications multiplexor comprises a multitude of different processes such as a listener process, dispatcher processes and agent processes in order to pass a client connection to a database. It describes TCP/IP messages as one possibility to pass the client connections as well as sockets, which may be used as an implementation of the above described operating system message queues.

The U.S. Pat. No. 7,249,227 B1 discloses a system for propagating write operations from a client to a server within a file storage system in a storage area network (SAN) or a network attached storage (NAS).

However, some of the above described prior art approaches have poor performance due to the number of involved copy operations, as illustrated in FIG. 1. The message queue interfaces of the operating system may only allow for a single buffer to be transferred with one call. If there is more than one client request buffer, the buffers at first have to be concatenated into a single temporary buffer (cf. the first copy operation C1 in FIG. 1). The message queue implementation in the operating system may then copy this temporary user buffer into a message buffer within the operating system address space (second copy operation C2). On the receiving side, the operating system message buffer may be copied into a temporary user buffer (third copy operation C3) and from there it may be finally copied into the server process address space (fourth copy operation C4). As apparent from FIG. 1, four copy operations are needed for the first half of the communication. Another four copy operations are needed for the response (C5-C8). If the buffers are of reasonable size, this is very time and computation extensive, leading to poor overall performance of the database system.

In view of the above, it is therefore the technical problem underlying the present invention to improve the efficiency of requests of a database client to a database server so that the communication requires less computing power and time and thereby at least partly overcomes the above explained disadvantages of the prior art.

3. SUMMARY OF THE INVENTION

This problem is according to one aspect of the invention solved by a method for managing the interprocess communication between at least one database client process and at least one database server process in a database system. The at least one database client process sends at least one request to the at least one database server process and the at least one request comprises one or more buffers. In the embodiment of claim 1, the method comprises the steps of:

a. transferring, in a single step, the one or more buffers from the at least one database client process to a buffer area; and
b. transferring, in a single step, the one or more buffers from the buffer area to the at least one database client process; wherein
c. the buffer area is directly accessible by the at least one database server process.

Accordingly, the request buffers provided by the database client process are first copied directly into a special buffer area. Because this copy step transfers all of the buffers in a single step, it substitutes the copy steps C1 and C2 of the prior art approach in FIG. 1. Furthermore, the prior art copy steps C3 and C4 are obsolete, since the database server process has direct access to the special buffer area, so that it may directly manipulate the buffers. Similarly, after the database server process has processed the request, the buffers are copied back to the database client process within a single step, so that only two copy operations are necessary to achieve the whole client/server communication, compared to eight copy operations in the prior art approach (see above).

The above described method defines the interprocess communication between database client processes and database server processes which are preferably located on the same physical machine. However, a database client process may also serve as a "proxy" for one or more remote clients, i.e. the local database client process handles the interprocess communication for one or more database clients which are located on physical machines different from the database server. Furthermore, in a distributed database system, more than one database server process may run on more than one physical machine and each of the database server processes may utilize the present invention.

In one aspect of the invention, the method may further comprise the step of blocking the at least one database server process, if a request queue is empty, and provide the at least one database server process with a handle to the one or more buffers in the buffer area.

Furthermore, step a. may comprise the further steps of inserting an element into the request queue and unblocking the at least one database server process.

The purpose of the request queue is to indicate that an incoming request is to be processed by the database server process. The database server process may, e.g. when it is started, inspect the request queue in order to determine if requests are pending. If no requests are pending, i.e. the request queue is empty, the database server is forced to block. When an element is inserted into the request queue, i.e. a request is to be processed, the database server process is unblocked again and subsequently gets a handle to the one or more buffers in the special buffer area. A handle may e.g. be a reference or a pointer to the address space of the buffers in the buffer area. Via the handle, the database server process may thus identify the new incoming request and execute it.

In another aspect of the invention, step b. comprises blocking the at least one database client process, if a response queue is empty.

Furthermore, the method may comprise the steps of inserting an element into the response queue and unblocking the at least one database client process when the request has been processed.

Accordingly, after the database client process has sent its request, i.e. it waits for a response by the database server process, it may block if a response queue is empty. When an element is inserted into the response queue, which indicates that the request has been processed, the database client process is unblocked and may proceed with the rest of step b., i.e. copying the buffers back to the database client process as described above.

The invention further relates to a computer program comprising instructions for implementing any of the above aspects.

According to a further aspect of the present invention, an interprocess communication driver (IPC driver) is provided for managing the interprocess communication between at least one database client process and at least one database server process in a database system. The at least one database client process sends at least one request to the at least one database server process and the at least one request comprises one or more buffers. The IPC driver comprises:
a. a first routine adapted for being called by the at least one database client process and further adapted for transferring, in a single step, the one or more buffers from the database client process to a buffer area; and
b. a second routine adapted for being called by the at least one database client process and further adapted for transferring, in a single step, the one or more buffers from the buffer area to the database client process; wherein
c. the buffer area is comprised in a memory of the database system and the memory is adapted for being directly accessible by the IPC driver and the at least one database server process.

Accordingly, the interprocess communication between the database server process and the client process is done by an IPC driver. The communication is based on a piece of memory which is shared by the database server process and the IPC driver and a set of routines provided by the IPC driver.

Firstly, when the database client process calls the first routine (subsequently called client write routine), the routine copies the database client buffers directly into the buffer area in a single step. Similarly, after the database server process has processed the request, the buffers are copied back to the database client process within a single step using the second routine (subsequently called client read routine).

In one aspect of the invention, the IPC driver further comprises a third routine adapted for being called by the at least one database client process and further adapted for blocking the database server process, if a request queue within the memory is empty, and for providing the database server process with a handle to the one or more buffers in the buffer area.

Furthermore, the first routine may be further adapted for inserting an element into the request queue and for unblocking the at least one database server process.

Accordingly, the third routine (subsequently called server read) forces the database server process to block, i.e. to wait until a request is to be processed and further provides the database server process a handle, i.e. a pointer or a reference, to the buffers of the request within the buffer area.

Besides the reduced number of copy operations, there is a performance advantage of this solution by reducing the number of system calls used. When a database server process waits for incoming requests as described above, i.e. for elements to be inserted into the request queue, it is able to get all its pending requests in one single system call, because all the elements of the request queue are preferably read with one system call. In contrast, in a message queue/network scenario according to the prior art, the database server typically accesses each request from each client with a separate system call (i.e. to get the request data from a message queue).

In another aspect, the second routine is further adapted for blocking the database client process if a response queue within the memory is empty. This forces the database client process to wait for a response in the client read routine.

Furthermore, the IPC driver may comprise a fourth routine adapted for being called by the at least one database server process and further adapted for inserting an element into the response queue and for unblocking the at least one database client process. The fourth routine (subsequently called server write) is to be called by the database server process after it has processed the request, i.e. after it has manipulated the buffers in the buffer area. By inserting an element into the response queue and unblocking the database client process, the database client process may finally proceed its execution and retrieve the response.

In one embodiment of the invention, the IPC driver is a UNIX kernel extension, the first routine is adapted for calling a UNIX writev system call and the second routine is adapted for calling a UNIX readv system call. In this case, the interprocess communication between the database server process and the database client process is done by an operating system kernel extension, i.e. a pseudo device driver. The buffers provided by the database client process are transferred to the IPC driver via a write system call. On UNIX, the writev and readv system calls may be used. These system calls provide support for reading and writing buffers from and to the UNIX kernel respectively, while the buffers are not necessarily in a contiguous memory space on the client side. The readv system call allows to read a buffer from the kernel and to distribute it into non-contiguous memory areas on the client site in one step. The writev system call allows to write the contents of non-contiguous memory areas on the client side to the kernel in one step.

According to yet another aspect of the invention, a database system is provided comprising at least one database client process, at least one database server process and an interprocess communication driver (IPC driver) with any of the above described characteristics. The database system further comprises a memory adapted for being directly accessible by the IPC driver and the at least one database server process and the database client process is adapted for calling the first routine and the second routine of the IPC driver.

In one aspect of the above database system, the at least one database server process is adapted for calling the third routine, for reading the one or more buffers determined by the handle, for executing the request, for writing a response into the one or more buffers and for calling the fourth routine. Accordingly, the database server process gets a handle to the buffers in the buffer area from the server read routine as soon as a request is pending. Because the database server process shares the buffer area with the IPC driver, there is no need for another copy operation. Via the handle obtained from the IPC driver, the database server process identifies the new incoming request and executes it. When the request processing is finished which may involve manipulating the buffers in the buffer area, the database server process passes the handle back to the driver and calls the server write routine in order to unblock the database client process.

In one aspect, the above database system is a UNIX system, the at least one database client process and the at least one database server process are UNIX user processes and the memory is a shared kernel memory.

4. SHORT DESCRIPTION OF THE DRAWINGS

Figure 2A:
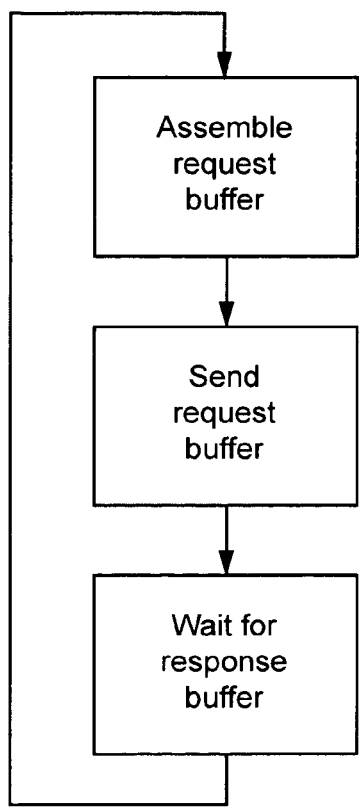
Figure 2B:
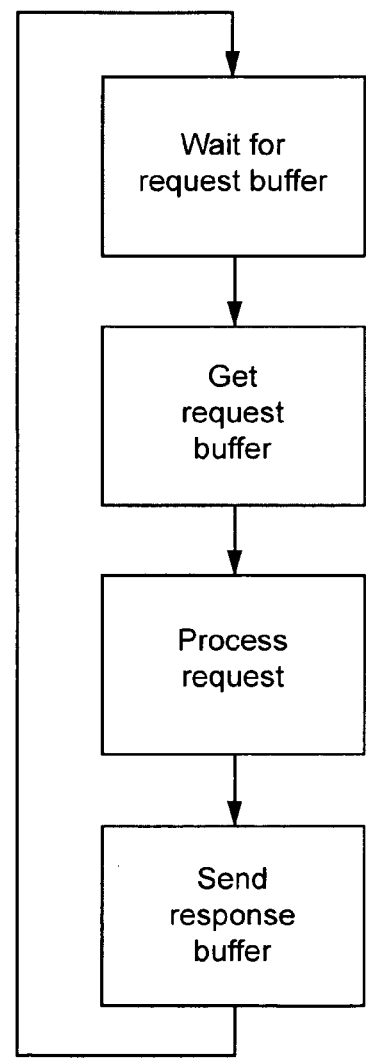
Figure 3:
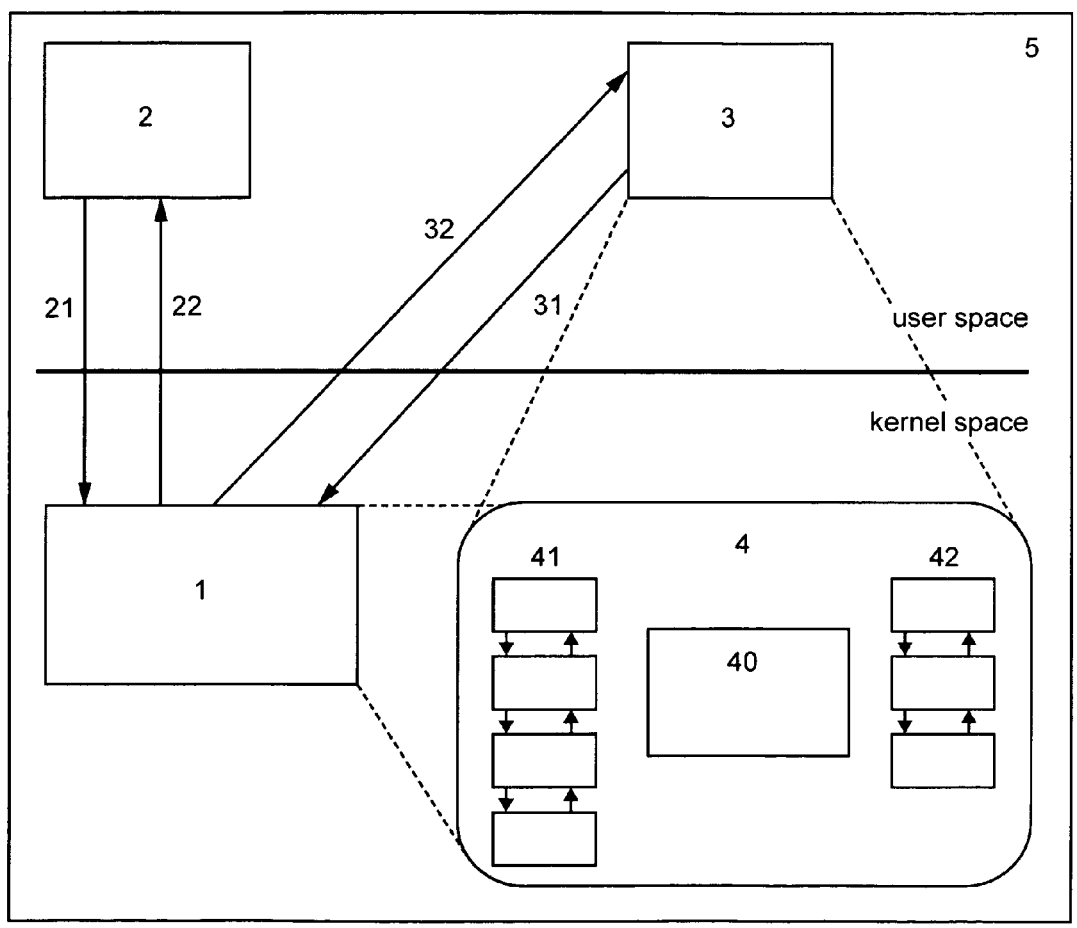
Figure 4:
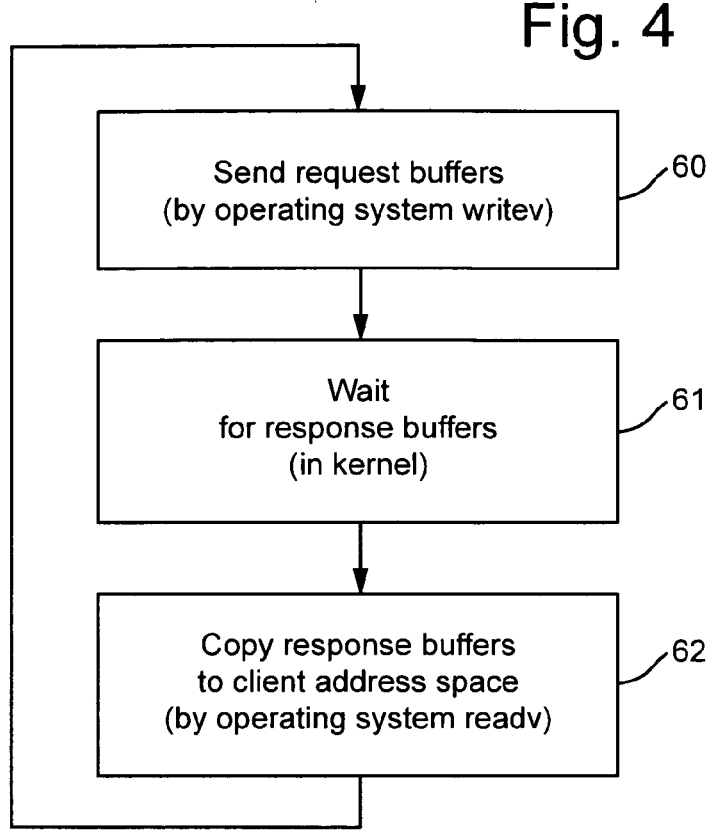
Figure 5:
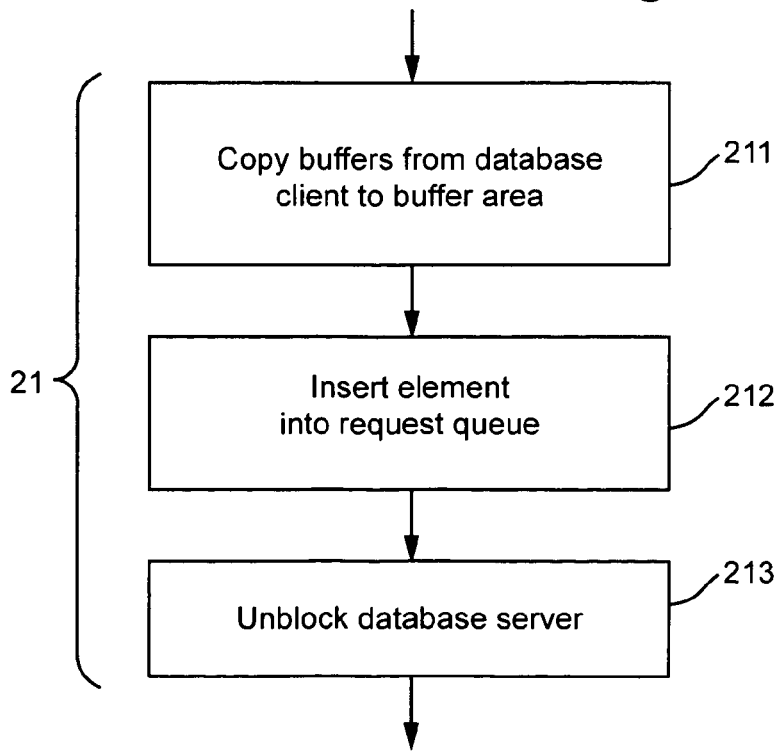
Figure 6:
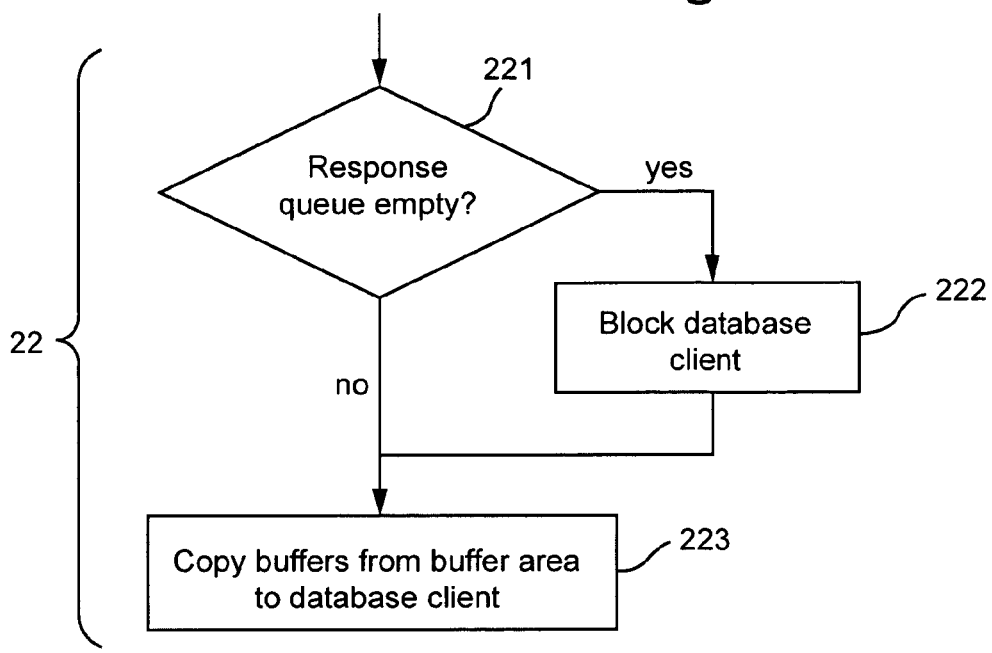
Figure 7:
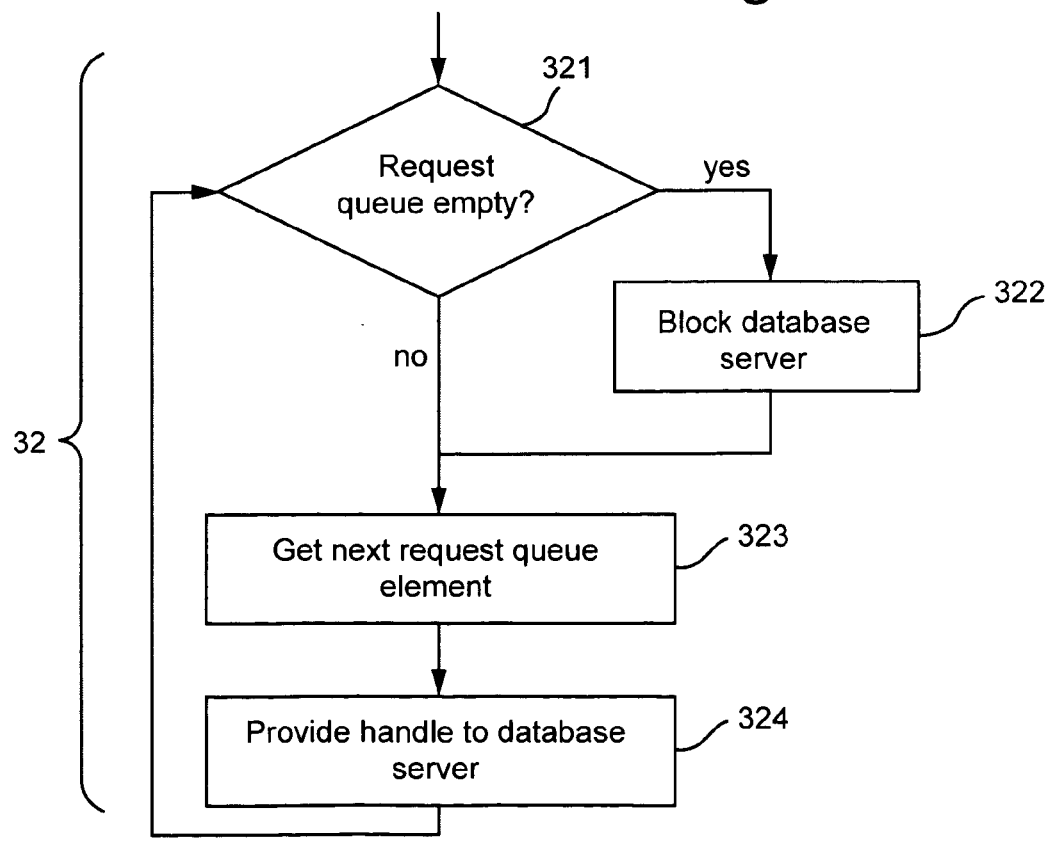
Figure 8:
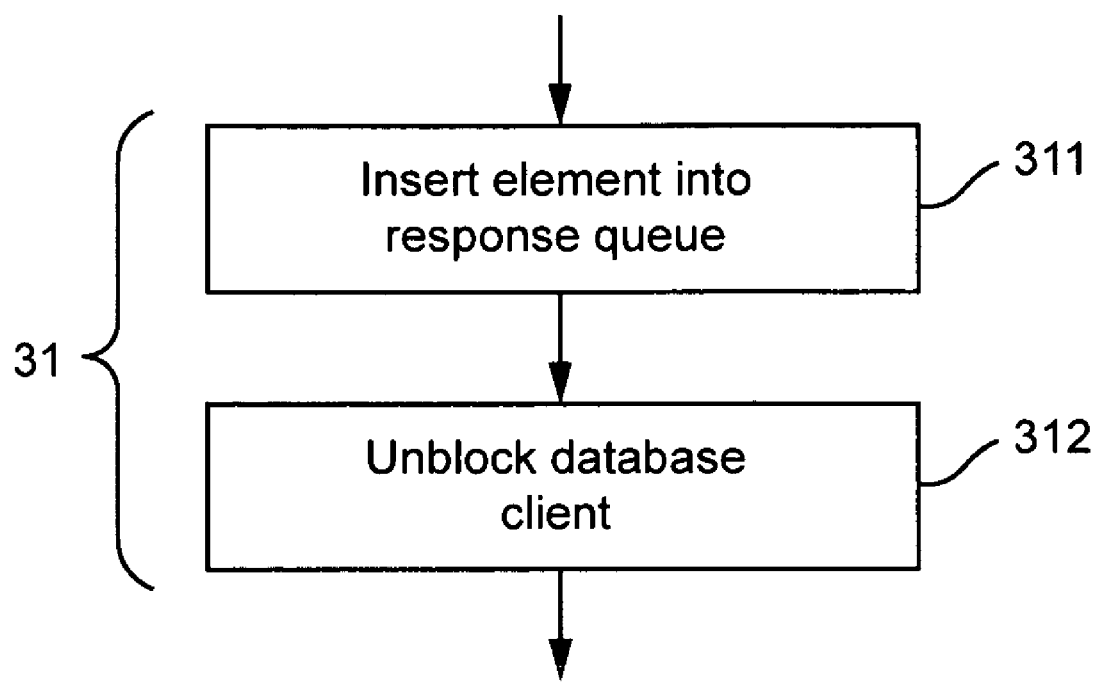
Figure 9:
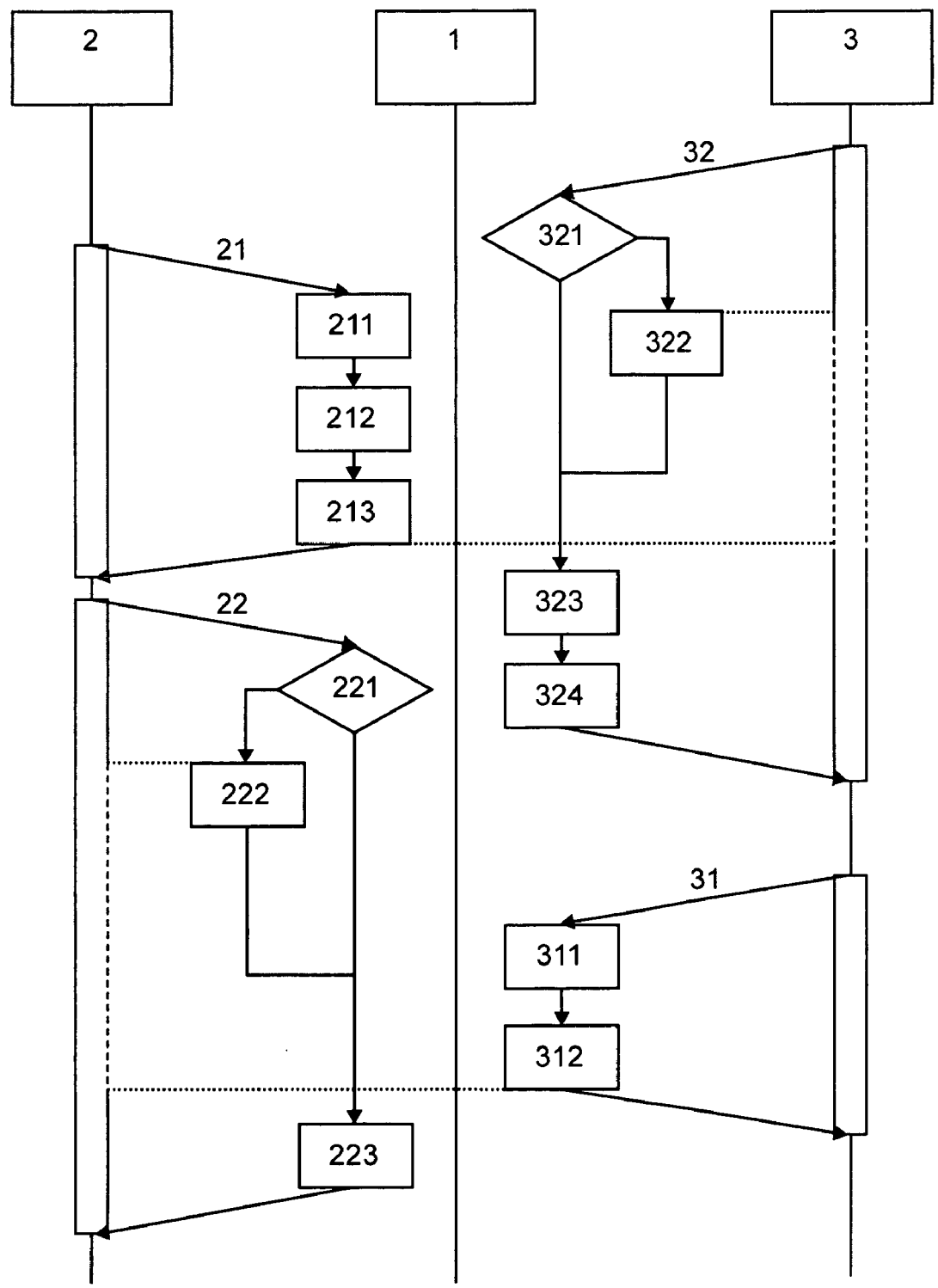

In the following detailed description, presently preferred embodiments of the invention are further described with reference to the following figures:

FIG. 1: A schematic view of a prior art approach to communicating requests between a database client and a database server;

FIG. 2*a*: A flow diagram describing the tasks performed by a database client according to the prior art;

FIG. 2*b*: A flow diagram describing the tasks performed by a database server according to the prior art;

FIG. 3: A schematic view of a database system according to an embodiment of the present invention;

FIG. 4: A flow diagram describing the tasks performed by a database client according to an embodiment of the present invention;

FIG. 5: A flow diagram describing the tasks performed by the IPC driver in response to a client write call;

FIG. 6: A flow diagram describing the tasks performed by the IPC driver in reponse to a client read call;

FIG. 7: A flow diagram describing the tasks performed by the IPC driver in reponse to a server read call;

FIG. 8: A flow diagram describing the tasks performed by the IPC driver in reponse to a server write call;

FIG. 9: A flow diagram describing the interworking of the tasks performed by the IPC driver.

5. DETAILED DESCRIPTION

In the following, a presently preferred embodiment of the invention is described with respect to a database system 5 as schematically shown in FIG. 3. As can be seen, the database system 5 comprises a database client process 2 and a database server process 3. The database system 5 further comprises an IPC driver 1 and a memory 4, wherein the memory 4 is shared between the IPC driver 1 and the database server process 3, i.e. both have direct access to the memory 4, and the memory 4 further comprises a buffer area 40, a request queue 41 and a response queue 42.

The IPC driver 1 preferably offers at least four routines to the database client process 2 and the database server process 3: a client write routine 21, a client read routine 22, a server write routine 31 and a server read routine 32. The four routines are defined for enabling the interprocess communication between the database client process 2 and the database server process 3 and will be described in the following.

Server Read: When the database server process 3 is ready to accept requests, e.g. directly after start-up of the server, it calls the server read routine 32 of the IPC driver depicted in FIG. 7. The server read routine 32 first checks if elements are present in the request queue 41 in step 321. If the request queue 41 is empty, the IPC driver 1 forces the database server process 3 to block in step 322. This makes sure that the next step 323 is only executed when there are elements in the request queue 41. In step 323, the IPC driver 1 fetches the next element from the request queue 41 and in step 234 provides a handle to the corresponding request to the database server process 3.

Server Write: After the database server 3 process has processed the request, it calls the server write routine 31 of the IPC driver 1 depicted in FIG. 8. The IPC driver 1 inserts an element into the response queue 42 in step 311 and unblocks the waiting database client process 2 in step 312.

Client Write: When the database client process 2 wants to send a request to the database server process 3, it calls the client write routine 21 of the IPC driver 1 depicted in FIG. 5. The IPC driver 1 first copies the request buffers into the buffer area 40 in step 211. To this end, it is crucial to copy all the request buffers in a single step in order to achieve the best performance. The IPC driver 1 then inserts an entry into the request queue 41 in step 212 and unblocks the database server process 3 in step 213.

Client Read: After the client write routine 21 has been processed and control returns to the database client process 2, the database client process 2 calls the client read routine 22 of the IPC driver 1 (see FIG. 6) in order to obtain the results of its request. To this end, the IPC driver 1 first checks whether there are elements in the response queue 42 in step 221 and blocks the database client process 2 in step 222 if the response queue 42 is empty. Finally, the IPC driver 1 copies in step 223 the buffers now comprising the database server process response from the buffer area 40 back to the database client process 2. To this end, it is crucial to copy all the request buffers in a single step in order to achieve the best performance The interworking of the four routines of the IPC driver 1 described above are explained in the context of an exemplary flow of tasks as illustrated in FIG. 9.

Firstly, the database server process 3 calls the server read routine 32 of the IPC driver 1 in order to obtain requests. Since the request queue 41 is still empty in step 321 (because no database client process has sent a request yet), the database server process 3 is blocked and remains in step 322.

On the client side, the database client process 2 wants to send a request and therefore calls the client write routine 21 of the IPC driver 1. The request buffers are copied into the buffer area 40 in step 211 and an element is inserted into the request queue 41 in step 212. Finally, the database server process 3 is unblocked in step 213. After the client write routine 21, the database client process 2 calls the client read routine 22 of the IPC driver 1. Since the response queue 42 is still empty in step 221 (since the database server process 3 has not processed the request yet) the database client process 2 is blocked in step 222.

Since the database server process 3 has been unblocked in step 213, it can now continue its processing within the server read routine 32. In step 323, the next element is fetched from the request queue 41 by the IPC driver 1 and a handle to the buffers of the corresponding request is provided to the database server process 3 in step 324.

The database server process 3 may now execute the request according to the contents of the request buffers in the buffer area 40 (not depicted in FIG. 9). Preferably, the database server process 3 writes the results of the execution of the request back into the buffers within the buffer area 40. After this is done, the database server process 3 calls the server write routine 31 of the IPC driver 1. The IPC driver 1 thus inserts an entry into the response queue 42 in step 311 and unblocks the database client process 2 in step 312.

The unblocked database client process may now finish its client read call, in that the buffers in the buffer area 40 are copied back to the database client process in step 223.

In one embodiment of the invention, the database system 5 is implemented on a UNIX operating system. However, it should be appreciated that UNIX is only one of a wide variety of operating systems and that the present invention may be implemented on any operating system satisfying the requirements of the invention.

A UNIX system is generally comprised of three layers: hardware, kernel and user mode software. The system hardware comprises e.g. the CPU, memory, serial devices, disk controllers disks and other peripheral devices such as graphics displays. On top of the hardware layer is the kernel layer, which serves for isolating higher level programs like application programs from the specific hardware and for controlling the physical access to the hardware components. The kernel further provides services to the higher level software layers through so called system calls. Thus, the only way for user programs to access system resources is through system calls. The upper-most user mode software layer finally comprises the user software.

The access of user programs to hardware resources in UNIX systems is provided by so called device drivers. However, a device driver does not necessarily need to control a physical device. Instead, it might simply utilize the UNIX driver framework to provide special or additional functionality to user programs. Such drivers are called pseudo device drivers.

The IPC driver 1 is in one embodiment of the present invention implemented as such a pseudo device driver so that it can directly access the memory 4 of the database system 5. The memory 4 is located in the kernel space. Furthermore, in order to provide an efficient communication of the requests from the database client process 2 to the database server process 3, i.e. for copying the buffers of the request into the buffer area 40 in a single step, the IPC driver 1 uses the writev system call provided by the UNIX database system 5. The writev system call is a variant of the write call which allows specifying multiple buffers to be transferred within a single call. Additionally, the single step of copying the buffers from the buffer area 40 back to the database client process 2 is facilitated by the readv system call of the UNIX database system 5. As already explained above, the readv system call allows to read a buffer from the kernel and to distribute it into non-contiguous memory areas on the client side in one step.

FIG. 4 illustrates this approach from the viewpoint of the database client process 2. The database client process 2 first sends its request, which internally results in a writev system call in step 60. The database client process then waits for a response in step 61 and finally receives the response in step 62, which is internally facilitated by a readv system call.

The invention claimed is:

1. A method for managing the interprocess communication between at least one database client process and at least one database server process in a database system, wherein the at least one database client process sends at least one request to the at least one database server process, the at least one request comprising one or more buffers, the method comprising:
   a. transferring, in a single step, the one or more buffers from the at least one database client process to a buffer area; and
   b. transferring, in a single step, the one or more buffers from the buffer area to the at least one database client process; wherein
   c. the buffer area is directly accessible by the at least one database server process.

2. The method of claim 1, further comprising blocking the at least one database server process, if a request queue is empty, and providing the at least one database server process with a handle to the one or more buffers in the buffer area.

3. The method of claim 2, wherein (a) further comprises inserting an element into the request queue and unblocking the at least one database server process.

4. The method of claim 1, wherein (b) further comprises blocking the at least one database client process if a response queue is empty.

5. The method of claim 4, further comprising inserting an element into the response queue and unblocking the at least one database client process when the request has been processed.

6. A non-transitory computer readable storage medium tangibly storing a computer program comprising instructions for implementing claim 1.

7. An interprocess communication driver (IPC driver) for managing the interprocess communication between at least one database client process and at least one database server process in a database system wherein the at least one database client process sends at least one request to the at least one database server process, the at least one request comprising one or more buffers, the IPC driver comprising:
   a. a first routine being callable by the at least one database client process and further configured to transfer, in a single step, the one or more buffers from the database client process to a buffer area; and
   b. a second routine being callable by the at least one client process and further configured to transfer, in a single step, the one or more buffers from the buffer area to the database client process; wherein
   c. the buffer area is comprised in a memory of the database system and the memory is directly accessible by the IPC driver and the at least one database server process.

8. The IPC driver of claim 7, further comprising a third routine being callable by the at least one database server process and further configured to block the database server process, if a request queue within the memory is empty, and to provide the database server process with a handle to the one or more buffers in the buffer area.

9. The IPC driver of claim 8, wherein the first routine is further configured to insert an element into the request queue and to unblock the at least one database server process.

10. The IPC driver of claim 7, wherein the second routine is further configured to block the database client process if a response queue within the memory is empty.

11. The IPC driver of claim 10, further comprising a fourth routine being callable by the at least one database server process and further configured to insert an element into the response queue and to unblock the at least one database client process.

12. The IPC driver of claim 7, wherein the IPC driver is a UNIX kernel extension, the first routine is configured to call a UNIX writev system call and the second routine is configured to call a UNIX ready system call.

13. A database system comprising at least one database client process, at least one database server process and an interprocess communication driver (IPC driver) according to claim 7, wherein the database system comprises a memory that is directly accessible by the IPC driver and the at least one database server process and wherein the at least one database client process (2) is adapted for calling the first routine (21) and the second routine (22) of the IPC driver(1).

14. The database system of claim 13, wherein the at least one database server process is configured to call a third routine, for reading the one or more buffers determined by the handle, for executing the request, for writing a response into the one or more buffers, and to call a fourth routine.

15. The database system of claim 13, wherein the database system is a UNIX system, the at least one database client and the at least one database server are UNIX user processes, and the memory is a shared kernel memory.

* * * * *

UNITED STATES PATENT AND TRADEMARK OFFICE
CERTIFICATE OF CORRECTION

PATENT NO. : 8,327,380 B2  
APPLICATION NO. : 12/457811  
DATED : December 4, 2012  
INVENTOR(S) : Greiner et al.

Page 1 of 1

It is certified that error appears in the above-identified patent and that said Letters Patent is hereby corrected as shown below:

In the Claims:

In Claim 12, at column 9, line 9, replace "ready" with --readv--

Signed and Sealed this  
Nineteenth Day of March, 2013

Teresa Stanek Rea  
*Acting Director of the United States Patent and Trademark Office*